United States Patent
Patel et al.

(10) Patent No.: US 11,194,742 B2
(45) Date of Patent: Dec. 7, 2021

(54) DETECTING POTENTIALLY OVERLAPPING INPUT/OUTPUT QUEUES

(71) Applicant: International Business Machines Corporation, Armonk, NY (US)

(72) Inventors: Kushal S. Patel, Pune (IN); Subhojit Roy, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 16/863,779

(22) Filed: Apr. 30, 2020

(65) Prior Publication Data
US 2021/0342276 A1 Nov. 4, 2021

(51) Int. Cl.
G06F 13/16 (2006.01)
G06F 3/06 (2006.01)
G06F 9/48 (2006.01)
G06F 13/20 (2006.01)

(52) U.S. Cl.
CPC ........ G06F 13/1642 (2013.01); G06F 9/4881 (2013.01); G06F 13/1668 (2013.01); G06F 13/20 (2013.01); *G06F 2213/0026* (2013.01)

(58) Field of Classification Search
CPC . G06F 13/1642; G06F 13/1673; G06F 3/0659
See application file for complete search history.

(56) References Cited

U.S. PATENT DOCUMENTS

| | | | |
|---|---|---|---|
| 10,019,181 B2 | 7/2018 | Singh et al. | |
| 10,387,078 B1 | 8/2019 | Benisty | |
| 2018/0285073 A1* | 10/2018 | Fukuchi | G06F 3/0659 |
| 2019/0042144 A1 | 2/2019 | Peterson et al. | |
| 2019/0317696 A1* | 10/2019 | Jagadish | G06F 3/0659 |

* cited by examiner

Primary Examiner — David E Martinez
(74) Attorney, Agent, or Firm — Zilka-Kotab, P.C.

(57) ABSTRACT

A computer-implemented method, according to one embodiment, includes: receiving an I/O queue creation request, and identifying a first CPU core that can satisfy the I/O queue creation request. A determination is made as to whether the first CPU core already has an I/O queue formed thereon. In response to determining that the first CPU core already has an I/O queue formed thereon, a determination is made as to whether any CPU cores do not already have an I/O queue formed thereon. In response to determining that each CPU core already has an I/O queue formed thereon, the host is informed that satisfying the I/O queue creation request will cause an overlap with existing I/O queues. In response to receiving an indication from the host to satisfy the I/O queue creation request despite the overlap, instructions are sent to use the first CPU core to satisfy the I/O queue creation request.

20 Claims, 9 Drawing Sheets

DETECTING POTENTIALLY OVERLAPPING INPUT/OUTPUT QUEUES

BACKGROUND

The present invention relates to data storage, and more specifically, this invention relates to detecting potential, and in some situations intentionally creating, overlapped input/output (I/O) queues.

Non-volatile memory express (NVMe) is a storage protocol that is designed for faster data transfer between servers, storage devices, Flash controllers, and other types of components that typically utilize peripheral component interconnect express (PCIe) busses. The specifications of the NVMe protocol provide a register interface and a command set which are capable of achieving increased I/O performance for data transmissions between storage systems. This is a desirable alternative to conventional standards, e.g., such as Small Computer System Interface (SCSI) standards, Serial AT Attachment (SATA), etc., which are not capable of achieving similar levels of performance.

For instance, NVMe supports parallel I/O processing with multicore servers which is capable of achieving faster I/O dispensation as well as a reduction in I/O latency. However, while the NVMe protocol is able to support a multitude of queues that can be assigned to different central processing unit (CPU) cores to achieve parallelism, these queues can be created at any time and for any reason. Accordingly, conventional processes have routinely experienced queues which overlap on individual CPU cores. In such scenarios, workloads that are transmitted through the overlapped queues are served by a single CPU core at the storage controller, thereby reducing parallelism at the storage controller. This also creates additional resource overhead for queue management and consumes additional resources at the storage target. As a result, these conventional implementations experience an improper utilization of the limited target memory resources that are available.

SUMMARY

A computer-implemented method, according to one embodiment, includes: receiving an I/O queue creation request from a host, and identifying a first CPU core that can be used to satisfy the I/O queue creation request. A determination is also made as to whether the first CPU core already has an I/O queue formed thereon. In response to determining that the first CPU core does already have an I/O queue formed thereon, a determination is made as to whether any CPU cores do not already have a respective I/O queue formed thereon. Moreover, in response to determining that each CPU core already has an I/O queue formed thereon, one or more instructions are sent to inform the host that satisfying the I/O queue creation request will cause an overlap with one or more existing I/O queues. Furthermore, in response to receiving an indication from the host to satisfy the I/O queue creation request despite the overlap, one or more instructions are sent to use the first CPU core to satisfy the I/O queue creation request.

A computer program product, according to another embodiment, includes a computer readable storage medium having program instructions embodied therewith. The program instructions are readable and/or executable by a processor to cause the processor to: perform the foregoing method.

A system, according to yet another embodiment, includes: a processor, and logic integrated with the processor, executable by the processor, or integrated with and executable by the processor. The logic is configured to: perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
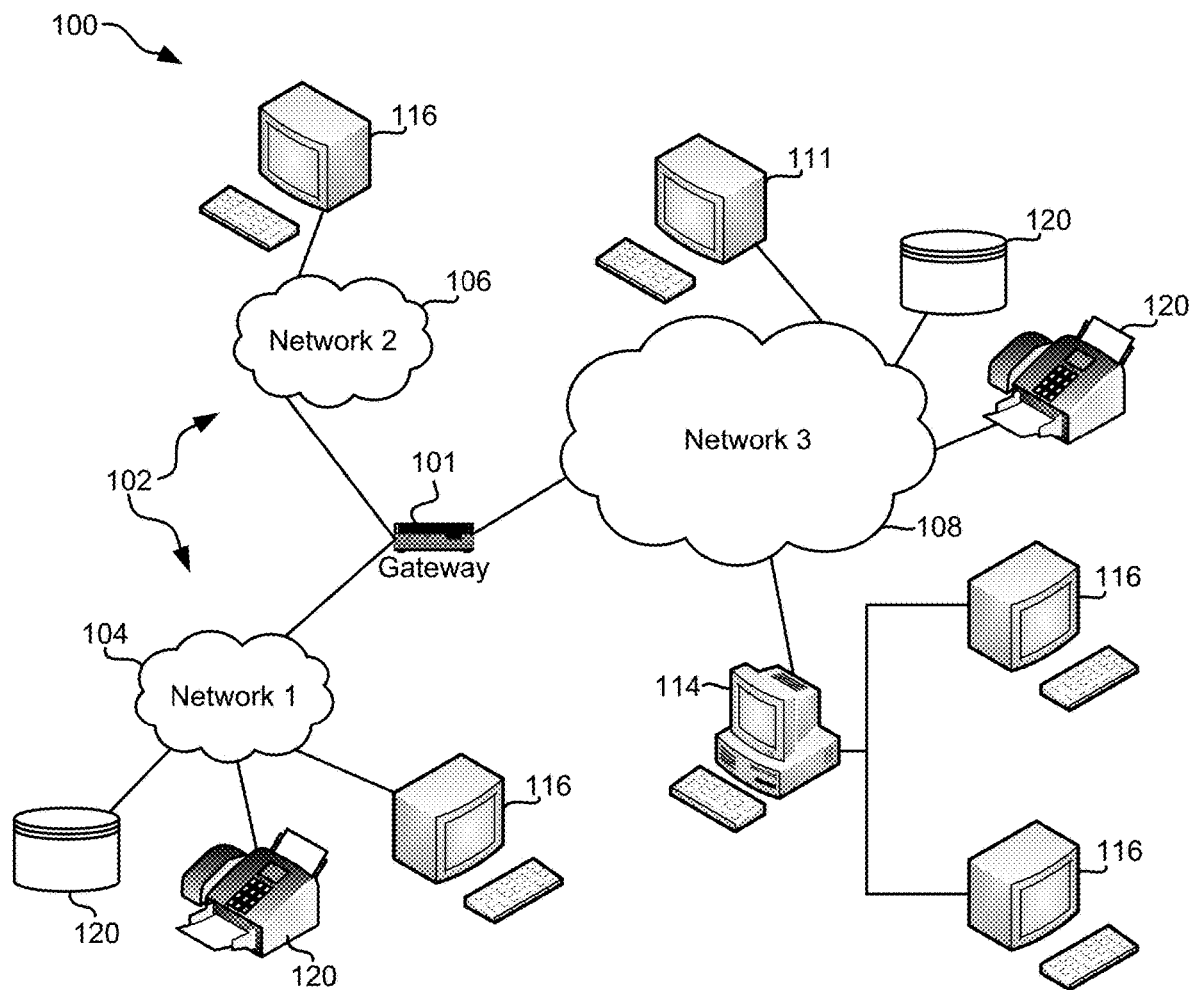
FIG. 1 is a diagram of a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for identifying potential I/O queue overlap situations from a same host. Moreover, these identified situations may be avoided in some approaches, thereby avoiding performance degradation that may otherwise be experienced by the improper utilization of storage resources, drops in response time, IOPs, etc., e.g., as will be described in further detail below.

In one general embodiment, a computer-implemented method includes: receiving an I/O queue creation request from a host, and identifying a first CPU core that can be used to satisfy the I/O queue creation request. A determination is also made as to whether the first CPU core already has an I/O queue formed thereon. In response to determining that the first CPU core does already have an I/O queue formed thereon, a determination is made as to whether any CPU cores do not already have a respective I/O queue formed thereon. Moreover, in response to determining that each CPU core already has an I/O queue formed thereon, one or more instructions are sent to inform the host that satisfying the I/O queue creation request will cause an overlap with one or more existing I/O queues. Furthermore, in response to receiving an indication from the host to satisfy the I/O queue creation request despite the overlap, one or more instructions are sent to use the first CPU core to satisfy the I/O queue creation request.

In another general embodiment, a computer program product includes a computer readable storage medium having program instructions embodied therewith. The program instructions are readable and/or executable by a processor to cause the processor to: perform the foregoing method.

In yet another general embodiment, a system includes: a processor, and logic integrated with the processor, executable by the processor, or integrated with and executable by the processor. The logic is configured to: perform the foregoing method.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM-based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
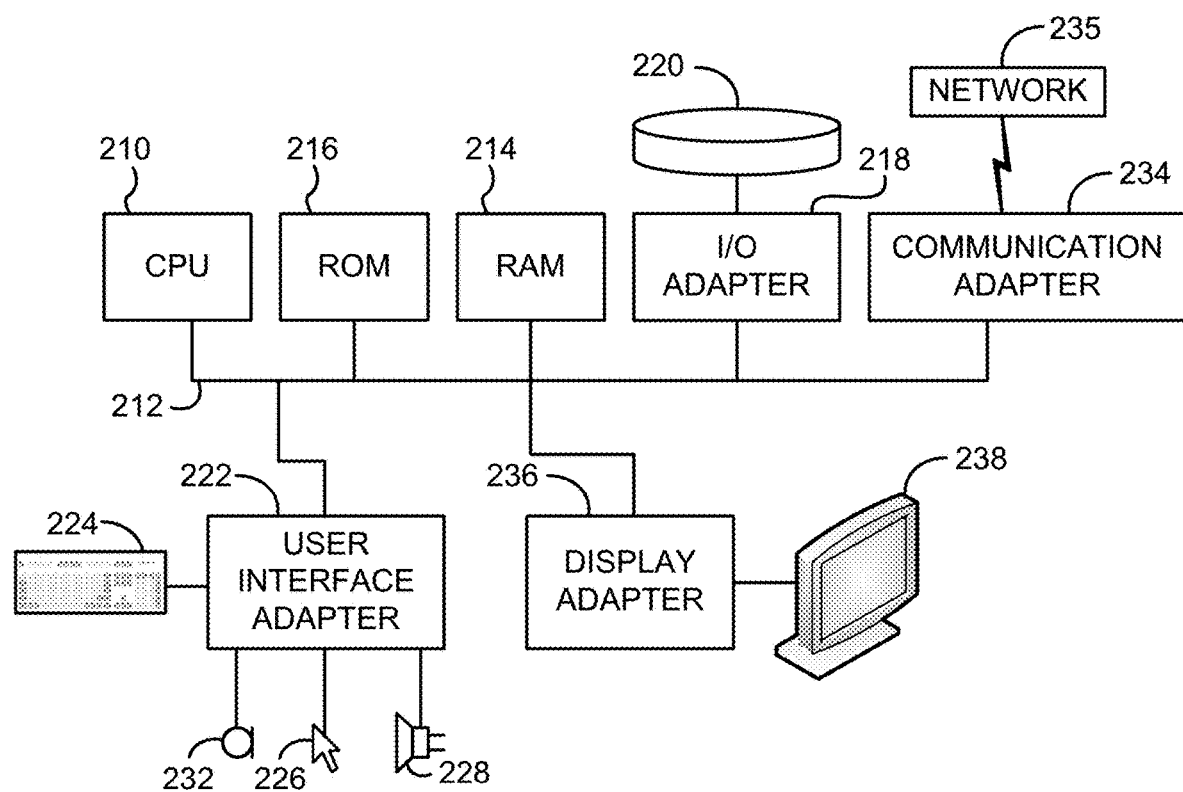
FIG. 2 is a diagram of a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
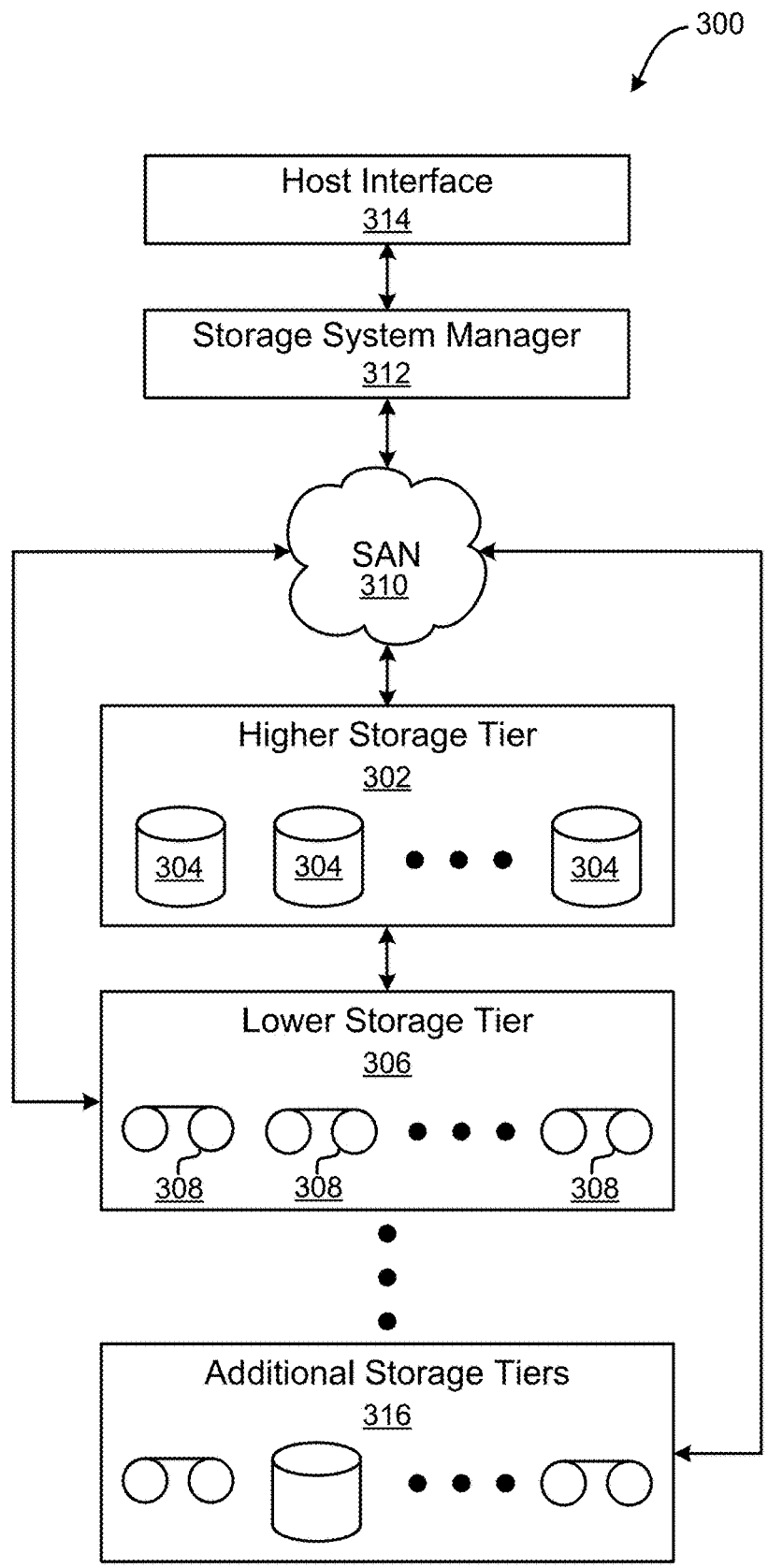
FIG. 3 is a diagram of a tiered data storage system, in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As previously mentioned, NVMe is a storage protocol that is designed for faster data transfer between servers, storage devices, Flash controllers, and other types of components that typically utilize PCIe busses. Accordingly, the specifications of the NVMe protocol provide a register interface and a command set which are capable of achieving increased I/O performance for data transmissions between storage systems. This is a desirable alternative to conventional standards which are not able to achieve similar levels of performance.

For instance, NVMe supports parallel I/O processing with multicore servers that results in faster I/O dispensation and a reduction in I/O latency. Since there are multiple CPU cores that are processing I/O requests simultaneously, system performance increases due to improved utilization of CPU resources. Additionally, NVMe is designed in such a way that it expects to use a fewer number of CPU instructions for each I/O operation. It should also be noted that the NVMe protocol supports about 64,000 commands in a single message queue and a maximum of 65,535 I/O queues.

NVMe over Fabrics (NVMe-oF) is an extension to local PCIe NVMe which allows the benefits of NVMe, e.g., such as experiencing high-performance and low-latency across network fabrics. Servers and storage devices can be connected over an interface such as an Ethernet network or Fibre Channel, both of which support NVMe commands over the fabric. Thus, the advantages of NVMe protocol are experienced by interconnected system components. Moreover, these advantages of implementing NVMe-oF may be achieved while only experiencing a minimal amount of latency (e.g., less than about 10 microseconds) for communication between an NVMe host computer and a network-connected NVMe storage devices.

NVMe-oF also supports multiple I/O queues for regular I/O operations that are exchanged between host to storage systems. For instance, up to about 65,000 queues are supported by NVMe with about 64,000 entries in each queue. Once a host is connected to a target system, a special purpose queue (e.g., the "admin queue") is created upon association. As the name suggests, the admin queue is used to transfer control commends from initiator (host) to the target device. Once the admin queue is created, it is used by a host to create I/O queues based on system specifications. For instance, the host may establish multiple I/O queues to a single controller with the same NVMe qualified name (NQN), and have multiple namespaces (or volumes) mapped thereto. Once an I/O queue has been established, I/O commands are submitted to the I/O submission queue, and I/O responses are collected from the completion queue. Moreover, I/O queues can be added or removed using control instruction sent via the respective admin queue.

However, while the NVMe protocol is able to support a multitude of queues that can be assigned to different CPU cores to achieve parallelism, these queues can be created at any time and for any reason. Accordingly, conventional processes have routinely experienced queues which overlap on individual CPU cores. In such scenarios, workloads that are transmitted through the overlapped queues are served by a single CPU core at the storage controller, thereby reducing parallelism at the storage controller. This also creates additional resource overhead for queue management and consumes additional resources at the storage target. As a result, these conventional implementations experience an improper utilization of the limited target memory resources that are available.

In sharp contrast to the aforementioned shortcomings experienced by conventional procedures, the various embodiments included herein are able to identify potential overlapping I/O queues and adjust accordingly. For instance, when a command is received on the target device for I/O queue creation, it performs initial system checks for max supported queues and other relevant fields and creates an I/O queue and assigns this I/O queue to a CPU core on the storage controller. Once this has been performed, a response to the queue creation request is returned via the admin completion queue. Each I/O queue is preferably assigned to a different CPU core on the storage controller, as this allows parallelism and boosts throughput of the overall system. In some approaches, CPU core assignment logic is implemented at the target storage controller. It should also be noted that the mapping between I/O queues and CPU cores may be performed based on a predefined policy at the storage controller, e.g., as would be appreciated by one skilled in the art after reading the present description.

Figure 4A:
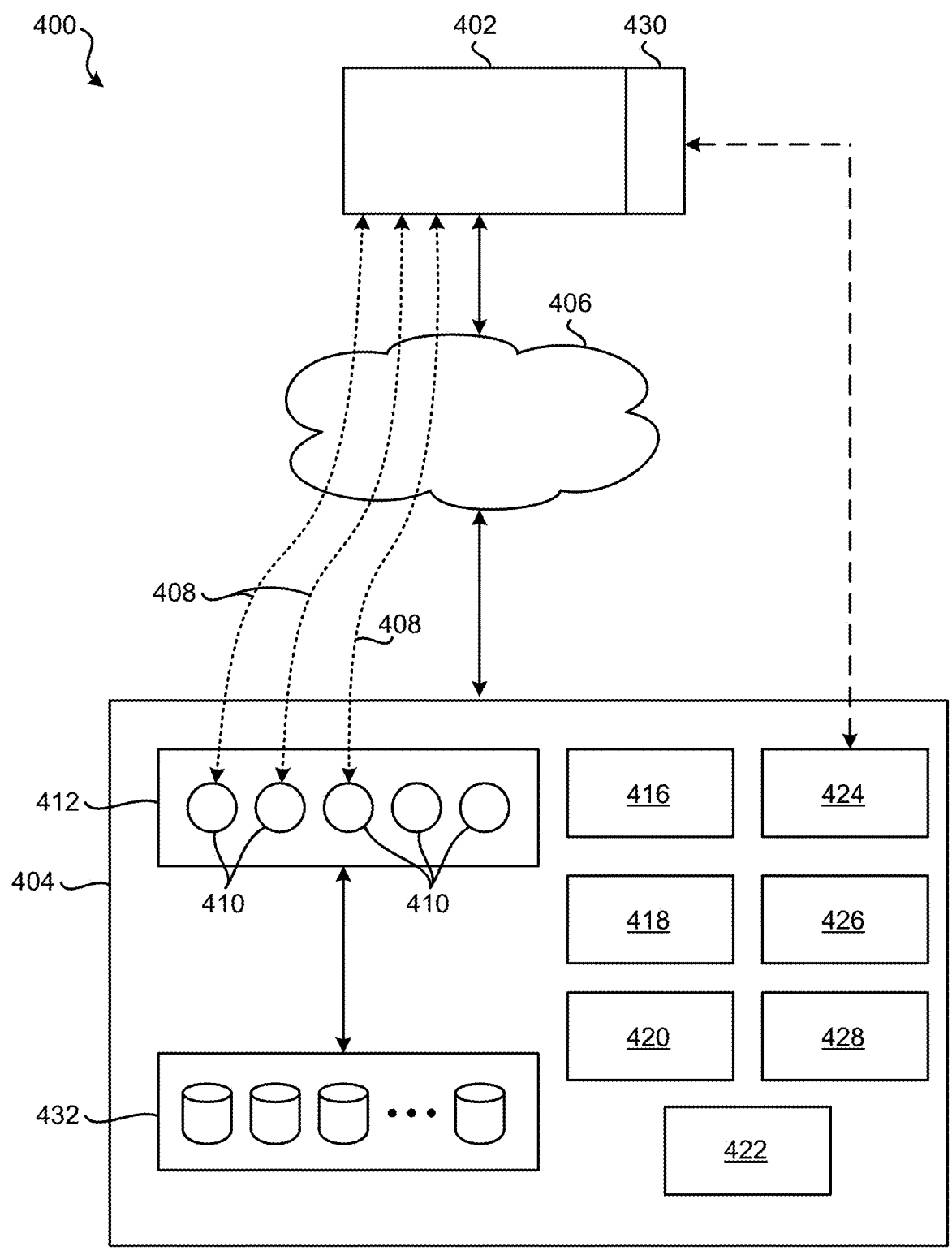
FIG. 4A is a partial representational view of a data storage network, in accordance with one embodiment.

Looking now to FIG. 4A, a data storage network 400 is illustrated in accordance with one embodiment. As an option, the present data storage network 400 may be implemented in conjunction with features from any other embodiment listed herein, such as those described with reference to the other FIGS. However, such data storage network 400 and others presented herein may be used in various applications and/or in permutations which may or may not be specifically described in the illustrative embodiments listed herein. Further, the data storage network 400 presented herein may be used in any desired environment. Thus FIG. 4A (and the other FIGS.) may be deemed to include any possible permutation.

As shown, the data storage network 400 includes a host 402 and a storage system 404 which are connected to each other by a network 406. The network 406 may be of any type, e.g., depending on the desired approach. For instance, in some approaches the network 406 is a WAN, e.g., such as the Internet. However, an illustrative list of other network types which network 406 may implement includes, but is not limited to, a LAN, a PSTN, a SAN, an internal telephone network, etc. Accordingly, the host 402 and a storage system 404 are able to communicate with each other regardless of the amount of separation which exists therebetween, e.g., despite being positioned at different geographical locations.

The host 402 preferably utilizes the NVMe-oF protocol to communicate with the storage system 404 over the network 406. As noted above, NVMe-oF is an extension to local PCIe NVMe which allows the benefits of NVMe, e.g., such as experiencing high-performance and low-latency across network fabrics. Moreover, these advantages of implementing NVMe-oF may be achieved while only experiencing a minimal amount of latency for communications between the host 402 and the storage system 404. Accordingly, the host 402 is able to establish multiple I/O queues for regular I/O operations that are exchanged between the host 402 and the storage system 404. As previously mentioned, up to about 65,000 queues are supported by NVMe with about 64,000 entries in each queue.

Moreover, once the host 402 is connected to the storage system 404, a special purpose "admin queue" may be established therebetween upon association. As the name suggests, the admin queue is used to transfer control commends from initiator (host 402) to the target device (storage system 404). Once the admin queue is created, it is used by the host 402 to create additional I/O queues based on system specifications. Accordingly, a number of I/O queues 408 are represented by dashed lines which extend between the host 402 and the storage system 404 through the network 406. Looking specifically to the storage system 404, each of the I/O queues 408 are assigned to a specific CPU core 410 in a CPU 412.

The process of establishing a new I/O queue 408 between the host 402 and the storage system 404 may be performed by implementing any one or more of the processes that are described herein (e.g., see FIGS. 5A-5B below). Moreover, looking to FIG. 4B a detailed view of the CPU cores 410 in the CPU module 412 of FIG. 4A is illustrated in accordance with one embodiment. As shown, although each I/O queue 408 extends between the respective CPU core 410 and the host 402 as shown in FIG. 4A, the I/O queues 408 are also connected to a controller 450 which may be used to manage information that is sent and/or received using the I/O queues 408. In some approaches the controller 450 that the I/O queues 408 are connected to is a NVMe controller (e.g., see 418 in FIG. 4A), but the controller 450 may be any desired type of processing component.

Figure 4B:
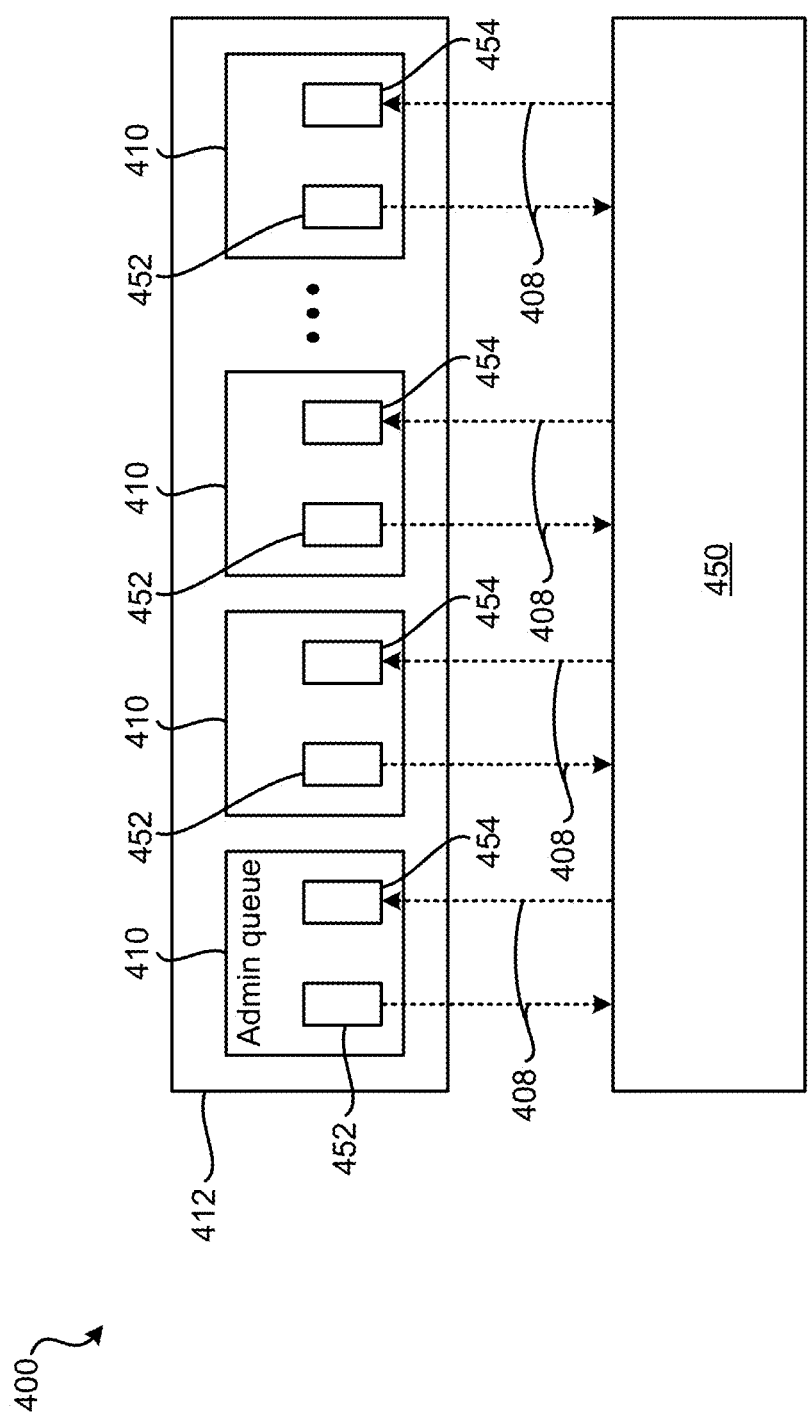
FIG. 4B is a partial detailed view of several of the components in the data storage network of FIG. 4A, in accordance with one embodiment.

With continued reference to FIG. 4B, each of the CPU cores 410 are shown as having a submission queue 452 and a completion queue 454. Each pair of submission and completion queues 452, 454 together form a single I/O queue which extends between the host and storage system (e.g., as seen in FIG. 5A). In other words, each I/O queue has a submission portion and a completion portion, thereby providing a bi-directional flow of information. The number of CPU cores 410 that are included in a given system also varies depending on the types of components used, user preference, system architecture, etc.

It should also be noted that the left-most CPU core 410 serves as a special purpose "admin queue" which may initially be established between the host and the storage system. As noted above, the admin queue is used to transfer control commends from the host to the storage system and therefore may be used in the process of creating the remaining I/O queues that are shown.

Returning now to FIG. 4A, once an I/O queue 408 has been established, I/O commands are submitted to an I/O submission queue, and I/O responses are collected from the completion queue. Moreover, I/O queues can be added or removed using control instruction sent via the respective admin queue. In addition to the CPU cores 410, the storage system 404 includes a number of modules which are able to communicate with each other and may thereby be utilized in the process of establishing and maintaining the I/O queues 408. For instance, the NVMe queue manager 416 is used in some approaches to receive I/O queue creation requests, e.g., that are sent by the host 402. In other approaches, the NVMe queue manager 416 may simply receive one or more instructions to use a particular one of the CPU cores 410 to satisfy a received I/O queue creation request. Moreover, in response to receiving the one or more instructions, the NVMe queue manager 416 may create an I/O queue on the specified CPU core 410. The NVMe queue manager 416 may also be able to identify potential I/O queue overlaps and notify the host of such situations, e.g., as will be described in further detail below.

As alluded to above, the NVMe controller 418 may be used to distribute information (e.g., data, operations, requests) that is received from the host 402 to the respective CPU cores 410, and vice-versa. In other words, the NVMe controller 418 may serve as an intermediary between the CPU cores 410 and the host 402. Accordingly, the NVMe controller 418 may be used to perform any one or more of the processes included in FIGS. 5A-5B to determine whether to form a new I/O queue in response to receiving a request to do so from the host 402, e.g., as will be described in further detail below.

Moreover, the virtualization and I/O management stack 420 and configuration manager 422 may be used to monitor the I/O queues that have been formed and ensure successful performance thereof. The notifier engine 428 is also able to send notifications to the host 402 which pertain to the status of the storage system 404 and the various components that are included therein. For instance, in some approaches the notifier engine 428 may inform the host 402 that satisfying an I/O queue request received therefrom will result in a queue overlap (e.g., see operation 520 of FIG. 5A below).

Furthermore, the core-queue mapper module 426 may maintain a record of which I/O queues are mapped to which CPU cores. In other words, the core-queue mapper module 426 may be used to monitor the existing correlations that exist between the various I/O queues and the CPU cores that are used to establish them. The out-of-band API instance module 424 is also able to communicate with a corresponding out-of-band API instance module 430 at the host 402 location. According to some approaches, which are in no way intended to limit the invention, communication between the NVMe queue manager 416 and the notifier engine 428 can be achieved using out-of-band protocol. This out-of-band protocol may be accomplished using out-of-band APIs implemented by module 430 which are able to communicate between the host 402 and the storage system 404.

However, in some instances, both the host 402 and the storage system 404 may understand in-band communications using NVMe standards, in which case queue overlapping information and actuator signals can be passed therebetween as part of protocol frames programmatically, e.g., as would be appreciated by one skilled in the art after reading the present description. According to an example, which is in no way intended to limit the invention, the implementation can be achieved using reserved fields of I/O queue (IOQ) CONNECT response frames to communicate the overlapping information. However, it should be noted that any desired type of protocol may be utilized to achieve communication between the host 402 and the storage system 404, or any two or more of the various components included herein.

The CPU module 412 is also coupled to a data storage module 432 which includes a number of data storage components, e.g., such as HDDs, SSDs, tape drives, etc. depending on the desired approach. The data storage module 432 is thereby able to store data that may be used to satisfy I/O requests that are received along the established I/O queues. It should also be noted that while various ones of the components and/or modules that are included in the storage system 404 are not illustrated as being coupled together, they are preferably able to communicate with each other and are thereby at least able to wirelessly send information therebetween.

It follows that the storage system 404 is able to receive I/O queue requests, evaluate the requests that are received, and satisfy certain ones of the requests. The storage system 404 is also preferably able to identify I/O queue requests that would result in two or more overlapped I/O queues from a same host. As noted above, overlapping I/O queues are processed by a same CPU node, thereby counteracting the performance improvements that are achieved by implementing NVMe protocols in a data storage network 400. Thus, by preemptively identifying overlapping I/O queues, the storage system 404 is desirably able to detect and avoid scenarios that would otherwise result in performance degradation because of improper utilization of storage resources, drop-in response times, decreased IOPs, etc. This also helps frees up target and initiator memory which increases I/O parallelism of the system as a whole.

Figure 5A:
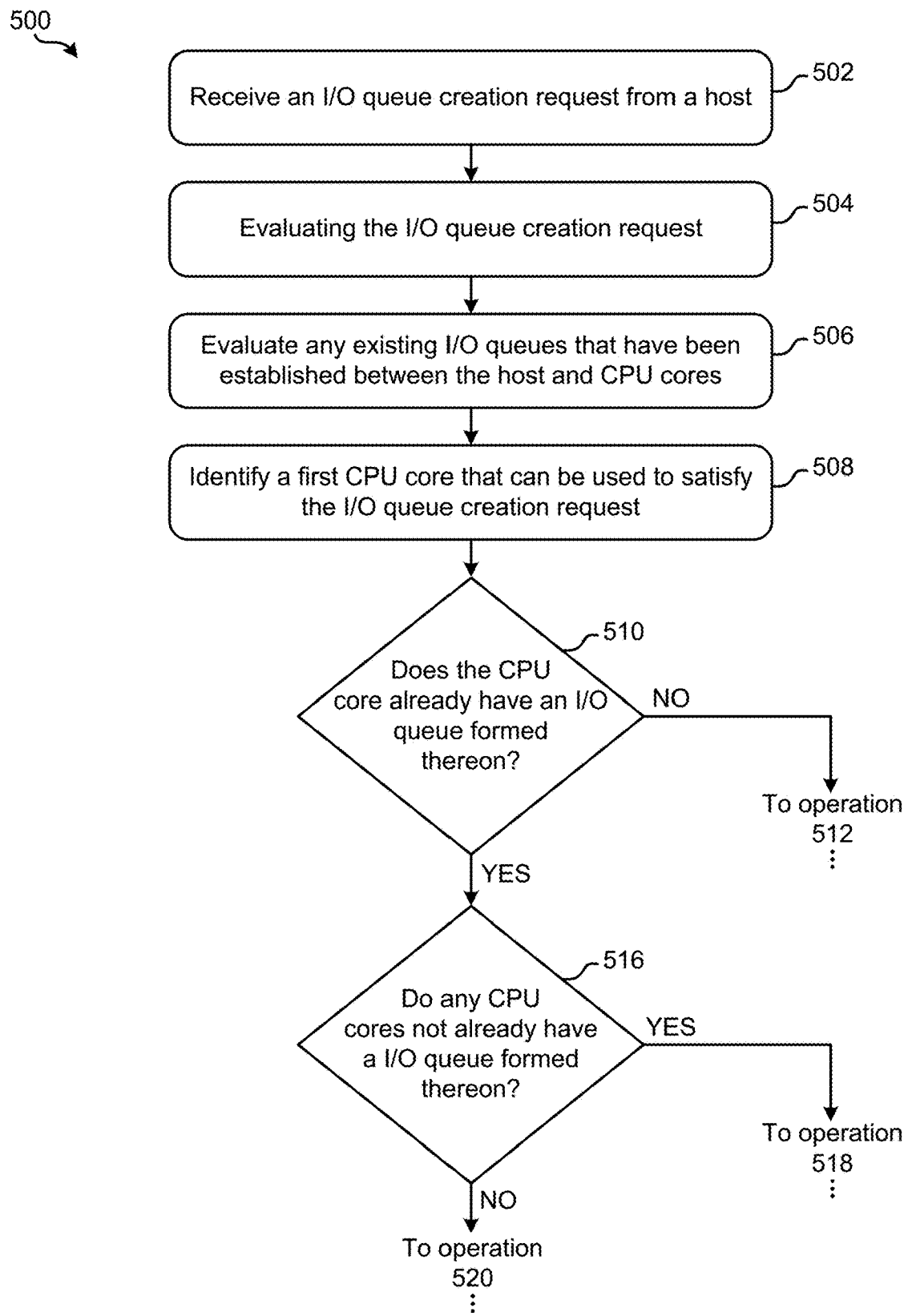
FIG. 5A is a flowchart of a method, in accordance with one embodiment.
Figure 5A:
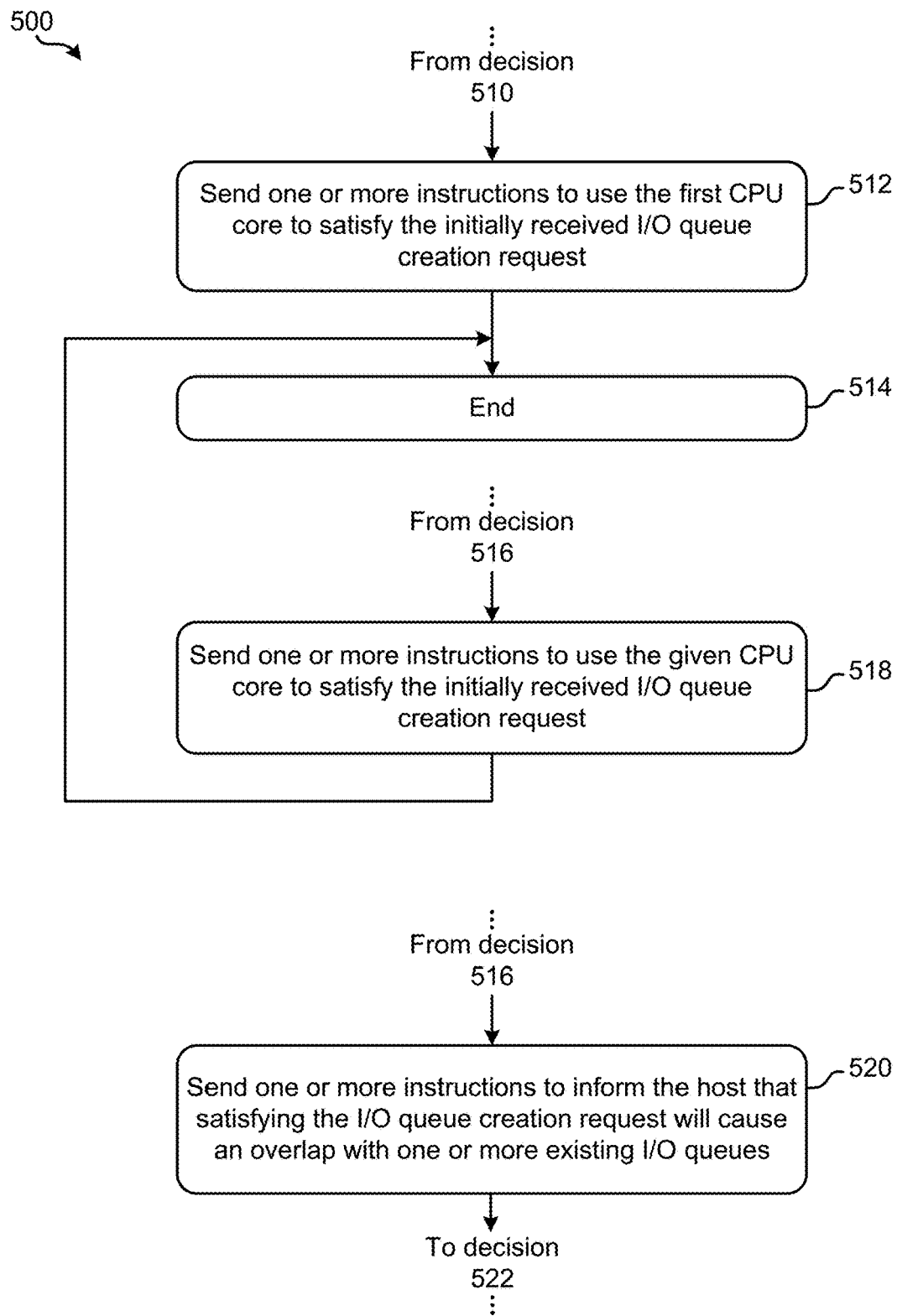
Figure 5A:
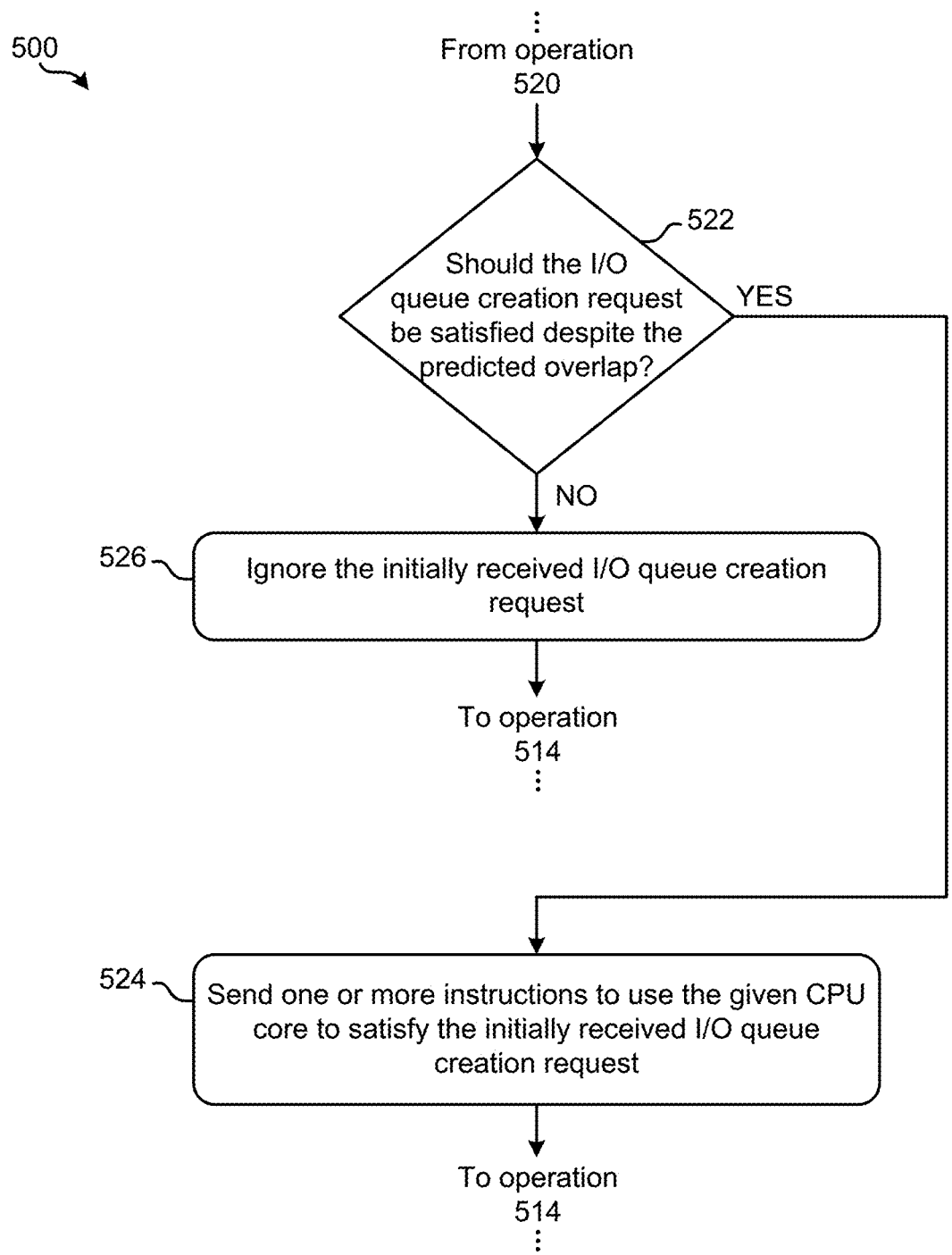

For instance, looking now to FIG. 5A, a flowchart of a method 500 is shown according to one embodiment. The method 500 may be performed in accordance with the present invention in any of the environments depicted in FIGS. 1-4B, among others, in various embodiments. Of course, more or less operations than those specifically described in FIG. 5A may be included in method 500, as would be understood by one of skill in the art upon reading the present descriptions.

Each of the steps of the method 500 may be performed by any suitable component of the operating environment. For example, in various embodiments, the method 500 may be partially or entirely performed by a controller, a processor, a computer, etc., or some other device having one or more processors therein. Thus, in some embodiments, method 500 may be a computer-implemented method. In such embodiments, the computer used to implement the method may include the tape drive itself or a portion thereof such as the controller, the tape, an external host, a server, etc. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, operation 502 of method 500 includes receiving an I/O queue creation request from a host. Depending on the approach, the host may be a user, a system administrator, another storage system, a storage controller, etc. Moreover, the I/O queue creation request may be received from the host over a network in some approaches (e.g., see 406 of FIG. 4A), but may be received in any form and/or over any type of medium.

In response to receiving the I/O queue creation request, method 500 proceeds to operation 504 which includes actually evaluating the received request and determining what it entails. In some approaches, evaluating the I/O queue creation request may include inspecting the request and determining whether a specific target location, queue type, special circumstances, etc., are distinguished therein. The I/O queue creation request may be compared against previously received creation requests and/or information that has been stored for reference in some situations.

From operation 504, method 500 proceeds to operation 506 which includes evaluating any existing I/O queues that have been established between the host and CPU cores. In other words, operation 506 includes evaluating any I/O queues which have already been formed on the available CPU cores and identifying any relevant information that may be used in the process of satisfying the I/O queue creation request that has been received. As noted above, it is undesirable for I/O queues to be overlapped (i.e., be formed at a same CPU core as another I/O queue received from a same host) as performance is degraded. Again, this is caused by the inability for the I/O queues to be processed in parallel by the shared CPU core.

Proceeding to operation 508, a first CPU core that can be used to satisfy the I/O queue creation request is identified. In other words, operation 508 includes identifying one of the CPU cores that is suitable to satisfy the I/O queue creation request. In some approaches, a specific type of CPU core (e.g., having a particular achievable throughput) may be desired to satisfy the I/O queue creation request. In such approaches, operation 508 may include identifying a CPU core which meets the specifications that are received along with the I/O queue creation request. In other approaches, operation 508 may simply involve identifying one of the CPU cores in a CPU module of the system. In still other approaches, operation 508 may actually include identifying a CPU core which has not already been used to form an I/O queue. It follows that operation 508 may be performed by inspecting the various CPU cores. Moreover, according to an exemplary approach which is in no way intended to limit the invention, operation 508 may be performed by a NVMe queue manager.

Decision 510 further includes determining whether the first CPU core already has an I/O queue formed thereon. In other words, decision 510 includes determining whether the CPU core identified in operation 508 already has an I/O queue formed thereon in response to an I/O queue creation request that was previously received from the same host. Decision 510 may be performed by actually inspecting the CPU core in some approaches, while in other approaches the determination may be made by accessing a lookup table of which stores previous I/O queue creation requests, examining a log of previous operations performed in a CPU module, etc.

In response to determining that the first CPU core identified in operation 508 does not already have an I/O queue formed thereon, method proceeds to operation 512 from decision 510. There, operation 512 includes sending one or more instructions to use the first CPU core to satisfy the initially received I/O queue creation request. In other words, operation 512 includes using the CPU core identified in operation 508 to perform the I/O queue creation request that was initially received in operation 502. The procedure of actually performing the I/O queue creation request may involve any one or more of the processes that are included herein. For instance, the I/O queue preferably includes a submission queue as well as a completion queue at the given CPU node. As noted above, the submission queue is used to receive information, requests, instructions, etc., while the completion queue is used to send data retrieved from storage, responses, etc.

It should also be noted that an admin queue has preferably already been established at the CPU module. In other words, the I/O queue creation request that was initially received in operation 502 is preferably not a first queue creation request received from the given host. Again, the admin queue is used to transfer control commends from initiator (host) to the target device, and once the admin queue is created, it is used to create I/O queues based on system specifications. For instance, the host may establish multiple I/O queues to a single controller with the same NVMe qualified name (NQN), and have multiple namespaces (or volumes) mapped thereto. Once an I/O queue has been established, I/O commands are submitted to the I/O submission queue, and I/O responses are collected from the completion queue. Moreover, I/O queues can be added or removed using control instruction sent via the respective admin queue.

However, in some situations the I/O queue creation request that was initially received in operation 502 may actually be a first request to establish an admin queue at a given CPU core. In such situations, the process of using the CPU core identified in operation 508 to perform the I/O queue creation request that was received may involve establishing an admin submission queue and an admin completion queue, e.g., as seen in FIG. 4B above.

Referring still to FIG. 5A, the flowchart proceeds from operation 512 to operation 514, whereby method 500 may end. However, it should be noted that although method 500 may end upon reaching operation 514, any one or more of the processes included in method 500 may be repeated in order to satisfy other I/O queue creation requests. In other words, any one or more of the processes included in method 500 may be repeated for any subsequently received I/O queue creation requests that are received from the host.

Returning now to decision 510, method 500 proceeds to decision 516 in response to determining that the first CPU core identified in operation 508 does already have an I/O queue formed thereon. There, decision 516 includes determining whether any CPU cores do not already have a respective I/O queue formed thereon. In other words, decision 516 includes determining whether any other CPU cores that can be used to satisfy the I/O queue creation request have not yet been used to satisfy another I/O queue creation request that was received from the same host. Once again, using a same CPU core to satisfy more than one I/O queue creation request received from a same host causes the resulting I/O queues to be overlapped. Moreover, overlapped I/O queues are unable to be processed in parallel as they share the same CPU core, thereby undesirably decreasing performance. Decision 516 is thereby able to avoid decreases in performance by identifying and avoiding such overlap.

Figure 5B:
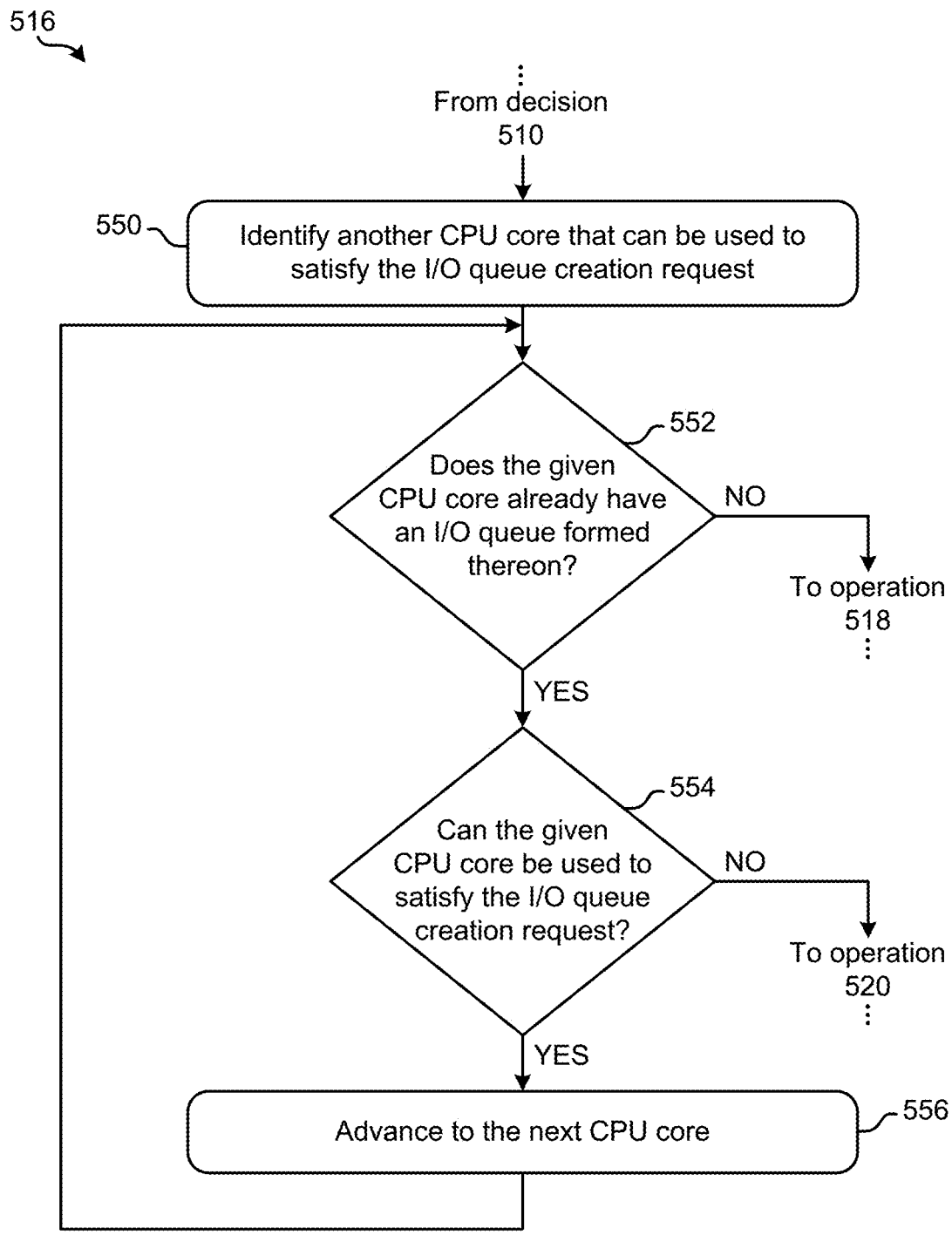
FIG. 5B is a flowchart of sub-processes for one of the operations in the method of FIG. 5A, in accordance with one embodiment.

Referring momentarily to FIG. 5B, exemplary sub-processes of determining whether any CPU cores do not already have a respective I/O queue formed thereon are illustrated in accordance with one embodiment. Accordingly, one or more of the sub-processes included in FIG. 5B may be used to perform decision 516 of FIG. 5A. However, it should be noted that the sub-processes of FIG. 5B are illustrated in accordance with one embodiment which is in no way intended to limit the invention.

As shown, sub-operation 550 includes identifying another CPU core that can be used to satisfy the I/O queue creation request. Any one or more of the approaches described herein with respect to performing operation 508 of FIG. 5A may be implemented in performing sub-operation 550. Moreover, decision 552 includes determining whether the given CPU core already has an I/O queue formed thereon. In response to determining that the given CPU core does not already have an I/O queue formed thereon, the flowchart proceeds from decision 552 back to operation 518 of FIG. 5A such that the given CPU core may be used to satisfy the I/O queue creation request, e.g., as will be described in further detail below.

However, in response to determining that the given CPU core already has an I/O queue formed thereon, the flowchart proceeds from decision 552 to decision 554. There, decision 554 includes determining whether another CPU core can be used to satisfy the I/O queue creation request. In other words, decision 554 includes determining whether each of the CPU cores have been evaluated with respect to the present I/O queue creation request. In response to determining that another CPU core can be used to satisfy the I/O queue creation request (e.g., that at least one of the CPU cores has not yet been evaluated with respect to the present I/O queue creation request), the flowchart proceeds from decision 554 to sub-operation 556. There, sub-operation 556 includes advancing to the next CPU core before returning to decision 552 such that the next CPU core may be evaluated to determine whether an I/O queue has already been formed thereon. It follows that sub-processes 552, 554, 556 may be repeated until each of the CPU cores have been evaluated.

Looking again to decision 554, the flowchart proceeds back to operation 520 of FIG. 5A such that the host may be informed that the I/O queue creation request cannot be satisfied without experiencing an I/O queue overlap, e.g., as will be described in further detail below.

Returning now to FIG. 5A, as mentioned above, in response to determining that a given CPU core that is capable of satisfying the I/O queue creation request does not already have an I/O queue formed thereon, the flowchart proceeds from decision 516 to operation 518. There, operation 518 includes sending one or more instructions to use the given CPU core to satisfy the initially received I/O queue creation request. As noted above, various ones of the processes included in FIGS. 5A-5B may be performed by a NVMe storage controller. Accordingly, the NVMe storage controller may actually send one or more instructions to a NVMe queue manager which actually creates the I/O queue on the given CPU core. Moreover, the flowchart proceeds directly from operation 518 to operation 514 whereby method 500 may end, e.g., as described above.

However, returning again to decision 516, method 500 proceeds to operation 520 in response to determining that each CPU core already has an I/O queue formed thereon. In other words, method 500 proceeds to operation 520 in response to determining that all of the CPU cores in the storage system performing method 500 already include an I/O queue formed thereon. This indicates that the I/O queue creation request received in operation 502 cannot be satisfied at the present time without experiencing an I/O queue overlap. Accordingly, operation 520 includes sending one or more instructions to inform the host that satisfying the I/O queue creation request will cause an overlap with one or more existing I/O queues. In some approaches, the one or more instructions that are sent in operation 520 are sent to a notifier engine (e.g., see 428 of FIG. 4A above) that is able to communicate with the host. Thus, the notifier engine may inform the host that the I/O queue creation request cannot be satisfied without experiencing an overlap.

Informing the host of the status of the I/O queue creation request may be achieved by sending any desired amount of information. For instance, the host may simply be informed that an overlap will occur as a result of satisfying the I/O queue creation request, while in other approaches the host may be informed as to which CPU cores are best suited to experience the overlap. For example, the I/O queue at a CPU core which has a particularly slow influx of I/O requests may be considered a best candidate to experience the I/O queue overlap, as the benefits of performing parallel operations therewith are reduced compared to the other I/O queues at the other CPU cores.

It follows that the host is effectively presented with a choice of whether to abandon the I/O queue creation request in response to the I/O queue overlap that would result, or accept the decline in performance that results from the I/O queue overlap. While decreased performance is undesirable, the tradeoff between high performance and achieved throughput may be weighed. In some situations, it may be more desirable to ignore the I/O queue creation request in the interest of maintaining high performance of the overall system, while in other situations it may be more desirable to have the I/O queue formed to avoid any loss in throughput. Once again, it is preferred that overlapped I/O queues are actively avoided, but in some situations, it may be more desirable to satisfy the I/O queue creation request, e.g., as would be appreciated by one skilled in the art after reading the present description.

Thus, an indication may be received from the host in response to the warning that was sent in operation 520. The indication may specify whether the host prefers to ignore the I/O queue creation request in the interest of efficiency, or accept the degraded performance that results from overlapping the I/O queues. The host may make this decision based on any number of factors, e.g., such as relative heat of the data, a number of I/O queue creation requests which have already been ignored, a time of day, a type of I/O queue, etc.

Thus, in response to receiving an indication from the host, decision 522 includes determining whether or not the I/O queue creation request should be satisfied anyways. In response to determining that the indication specifies the I/O queue creation request should be satisfied despite the overlap, method 500 proceeds to operation 524 which includes sending one or more instructions to use the given CPU core to satisfy the initially received I/O queue creation request. The process of creating an overlapping I/O queue may include any one or more of the approaches included herein. Moreover, from operation 524, the flowchart proceeds to operation 514 whereby method 500 may end, e.g., as described above.

However, in response to determining that the indication specifies the I/O queue creation request should not be satisfied despite the overlap, method 500 proceeds to operation 526. There, operation 526 includes ignoring the initially received I/O queue creation request. In other words, operation 526 includes intentionally not satisfying the initially received I/O queue creation request such that the overlapped I/O queues that would result are avoided. Moreover, from operation 526, the flowchart proceeds to operation 514 whereby method 500 may end, e.g., as described above.

It follows that various ones of the processes included in method 500 are able to sense I/O queue overlap situations. For example, method 500 is desirably able to identify situations where "Host A" already has I/O queues established on each of the available CPU cores, and now new I/O queue creation requests are received from the same Host A for one of the same used CPU cores. Once a I/O queue overlapping situation has been identified, the corresponding information may be sent (e.g., via a SIGNAL command) to an NVMe controller's administrative control unit. As a result, a notification of potential I/O queue overlap is sent either through internal communications or protocol level communications to the Host A. The protocol level implementation of this notification may include sending the information via Asynchronous Event Request (AER) command that provides a mechanism to send the asynchronous notification to the host. Alternatively, in some approaches the host may be notified by applying a special FLAG in the reserved fields of I/O queue creation response commands that will transmit the knowledge of potentially overlapping I/O queues to the host. The host then has the responsibility to read the information based on decoding mechanisms for response command FLAG or using AER command decoding.

Once the SIGNAL is received by the host, the host decides whether to continue with forming the I/O queue, or abandon the connection attempt. In some approaches, the same I/O queue creation request may be resubmitted after some time has passed, a number of I/O requests have been satisfied, etc. The host may decide whether to continue with forming the I/O queue in some approaches based on the I/O workload pattern of the host. For example, if the host is intending to rely on the resulting I/O queue to satisfy an IOPS intensive workload, the I/O queue creation request is preferably abandoned in an effort to gain more performance and efficient resource utilization. On the other hand, if the host has workload that is bandwidth intensive, or which has less performance specification, then the host may decide to proceed with forming the I/O queue despite the resulting overlap.

In some approaches, if the host can withstand the performance degradation that will likely result from the queue overlapping and/or the total decrease in IOPs, then it may be preferred that a continued connection to the CPU cores at the target using the overlapping I/O queues is maintained. However, if the host does not want to experience the performance degradation, but still wants to connect to the target, the host may decide to ignore the I/O queue creation request that was sent to the target, and re-initiate a connection after some time has passed, the connection does not re-initiate on its own, etc.

It should also be noted that in some approaches, communications between a NVMe queue manager and a host notifier can be accomplished through out-of-band protocol using out-of-band APIs implemented that are able to communicate between hosts and the storage controller clustered system. However, in situations where both systems are understanding in-band communication using NVMe standards, this queue overlapping information and/or actuator signals may be passed therebetween as part of protocol frames programmatically. The implementation can be done using reserved fields of IOQ CONNECT response frame to communicate this overlapping information, e.g., as would be appreciated by one skilled in the art after reading the present description.

Again, various ones of the approaches included herein are desirably able to improve memory management. For instance, as overlapped queues from the same host are not able to achieve the performance benefits of NVMe queue architectures as well as continuing to consume the resources for retention of the queues, some of the approaches herein are able to reduce the consequences of having overlapped I/O queues from the same host-core pair. This leads to improved utilization of resources in addition to freeing up the resources that are not otherwise providing benefits. Additionally, reduced queue overlap bottleneck is achieved by allowing the host to selectively cancel any I/O queue creation requests. Again, I/O queue overlap and improper resource utilization by the host I/O queues scenario is avoided, thereby allowing the host and storage target to experience improved resource management. This also avoids creating I/O queues which are not able to achieve parallelism.

The approaches herein may also be able to achieve better performance. For instance, in an I/O queue overlap situation when I/O queues are performing I/O requests simultaneously from the same host, the performance is limited because of I/O reception from multiple I/O queues, each of which need context switching for I/O handling across the queues. This will desirably be avoided by implementing various ones of the approaches herein which reduce the number of I/O queues from the same host, thereby benefitting performance.

These achievements are particularly desirable in comparison to the shortcomings that have been experienced by conventional processes. Again, I/O workloads transmitted through overlapped queues from a host are served by a single core at the storage controller, thereby essentially reducing parallelism at the storage controller. Additional memory and/or computing resources are also consumed at the storage controller level which are otherwise utilized for queue management and retention. It follows that I/O operations per second (IOPS) based workloads that are performed using overlapped queues significantly reduces performance efficiency as both queues are served by the same CPU core. Furthermore, this creates additional resource overhead for queue management that consumes extra resources at the storage target, thereby leading to improper utilization of limited target memory resources. It should also be noted that the use of NVMe and/or NVMe-oF protocols as used herein are in no way intended to be limiting. Rather any desired type(s) of protocols may be used depending on the approach, e.g., as would be appreciated by one skilled in the art after reading the present description.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving an input/output (I/O) queue creation request from a host;
identifying a first central processing unit (CPU) core that can be used to satisfy the I/O queue creation request;
determining whether the first CPU core already has an I/O queue formed thereon;
in response to determining that the first CPU core does already have an I/O queue formed thereon, determining whether any CPU cores do not already have a respective I/O queue formed thereon;
in response to determining that each CPU core already has an I/O queue formed thereon, sending one or more instructions to inform the host that satisfying the I/O queue creation request will cause an overlap with one or more existing I/O queues; and
in response to receiving an indication from the host to satisfy the I/O queue creation request despite the overlap, sending one or more instructions to use the first CPU core to satisfy the I/O queue creation request.

2. The computer-implemented method of claim 1, comprising:
in response to determining that the first CPU core does not already have an I/O queue formed thereon, sending one or more instructions to use the first CPU core to satisfy the I/O queue creation request.

3. The computer-implemented method of claim 1, comprising:
in response to determining that at least one CPU core does not have an I/O queue formed thereon, sending one or more instructions to use the at least one CPU core to satisfy the I/O queue creation request.

4. The computer-implemented method of claim 1, comprising:
in response to receiving an indication from the host to not satisfy the I/O queue creation request, ignoring the I/O queue creation request.

5. The computer-implemented method of claim 1, comprising:
in response to determining that a given CPU core does not already have an I/O queue formed thereon, sending one or more instructions to use the given CPU core to satisfy the I/O queue creation request.

6. The computer-implemented method of claim 1, wherein the operations are performed by a non-volatile memory express (NVMe) storage controller.

7. The computer-implemented method of claim 6, wherein the one or more instructions to use the first CPU core to satisfy the I/O queue creation request are sent to a non-volatile memory express (NVMe) queue manager, wherein in response to receiving the one or more instructions the NVMe queue manager creates an I/O queue on the first CPU core.

8. A computer program product comprising a computer readable storage medium having program instructions embodied therewith, the program instructions readable and/or executable by a processor to cause the processor to:
receive, by the processor, an input/output (I/O) queue creation request from a host;
identify, by the processor, a first central processing unit (CPU) core that can be used to satisfy the I/O queue creation request;
determine, by the processor, whether the first CPU core already has an I/O queue formed thereon;
in response to determining that the first CPU core does already have an I/O queue formed thereon, determine, by the processor, whether any CPU cores do not already have a respective I/O queue formed thereon;
in response to determining that each CPU core already has an I/O queue formed thereon, send, by the processor, one or more instructions to inform the host that satisfying the I/O queue creation request will cause an overlap with one or more existing I/O queues; and
in response to receiving an indication from the host to satisfy the I/O queue creation request despite the overlap, send, by the processor, one or more instructions to use the first CPU core to satisfy the I/O queue creation request.

9. The computer program product of claim 8, wherein the program instructions are readable and/or executable by the processor to cause the processor to:
in response to determining that the first CPU core does not already have an I/O queue formed thereon, send, by the processor, one or more instructions to use the first CPU core to satisfy the I/O queue creation request.

10. The computer program product of claim 8, wherein the program instructions are readable and/or executable by the processor to cause the processor to:
in response to determining that at least one CPU core does not have an I/O queue formed thereon, send, by the processor, one or more instructions to use the at least one CPU core to satisfy the I/O queue creation request.

11. The computer program product of claim 8, wherein the program instructions are readable and/or executable by the processor to cause the processor to:
in response to receiving an indication from the host to not satisfy the I/O queue creation request, ignore, by the processor, the I/O queue creation request.

12. The computer program product of claim 8, wherein the program instructions are readable and/or executable by the processor to cause the processor to:
in response to determining that a given CPU core does not already have an I/O queue formed thereon, send, by the processor, one or more instructions to use the given CPU core to satisfy the I/O queue creation request.

13. The computer program product of claim 8, wherein the operations are performed by a non-volatile memory express (NVMe) storage controller.

14. The computer program product of claim 13, wherein the one or more instructions to use the first CPU core to satisfy the I/O queue creation request are sent to a non-volatile memory express (NVMe) queue manager, wherein in response to receiving the one or more instructions the NVMe queue manager creates an I/O queue on the first CPU core.

15. A system, comprising:
a processor; and
logic integrated with the processor, executable by the processor, or integrated with and executable by the processor, the logic being configured to:
receive, by the processor, an input/output (I/O) queue creation request from a host;
identify, by the processor, a first central processing unit (CPU) core that can be used to satisfy the I/O queue creation request;
determine, by the processor, whether the first CPU core already has an I/O queue formed thereon;
in response to determining that the first CPU core does already have an I/O queue formed thereon, determine, by the processor, whether any CPU cores do not already have a respective I/O queue formed thereon;
in response to determining that each CPU core already has an I/O queue formed thereon, send, by the processor, one or more instructions to inform the host that satisfying the I/O queue creation request will cause an overlap with one or more existing I/O queues; and
in response to receiving an indication from the host to satisfy the I/O queue creation request despite the overlap, send, by the processor, one or more instructions to use the first CPU core to satisfy the I/O queue creation request.

16. The system of claim 15, wherein the logic is configured to:
in response to determining that the first CPU core does not already have an I/O queue formed thereon, send, by the processor, one or more instructions to use the first CPU core to satisfy the I/O queue creation request.

17. The system of claim 15, wherein the logic is configured to:
in response to determining that at least one CPU core does not have an I/O queue formed thereon, send, by the processor, one or more instructions to use the at least one CPU core to satisfy the I/O queue creation request.

18. The system of claim 15, wherein the logic is configured to:
in response to receiving an indication from the host to not satisfy the I/O queue creation request, ignore, by the processor, the I/O queue creation request.

19. The system of claim 15, wherein the logic is configured to:
in response to determining that a given CPU core does not already have an I/O queue formed thereon, send, by the processor, one or more instructions to use the given CPU core to satisfy the I/O queue creation request.

20. The system of claim 15, wherein the operations are performed by a non-volatile memory express (NVMe) storage controller, wherein the one or more instructions to use the first CPU core to satisfy the I/O queue creation request are sent to a non-volatile memory express (NVMe) queue manager, wherein in response to receiving the one or more instructions the NVMe queue manager creates an I/O queue on the first CPU core.

* * * * *